United States Patent Office 3,646,166
Patented Feb. 29, 1972

3,646,166
BUTYL RUBBER REACTION PRODUCTS
Nathan H. Canter, Edison, and Joseph P. Kennedy, Cranford, N.J., assignors to Esso Research and Engineering Company
No Drawing. Filed May 27, 1970, Ser. No. 41,087
Int. Cl. C08f 15/00, 19/00
U.S. Cl. 260—879
15 Claims

ABSTRACT OF THE DISCLOSURE

Ionic crosslinking is introduced into an uncured butyl rubber by halogenation of butyl rubber, dehydrohalogenation to form conjugated double bonds and reaction of an ethylenically unsaturated compound such as maleic anhydride with this conjugated double bond system to form a graft polymer. The graft polymer is then reacted with a metallic salt or an amine to form an ionic hydrocarbon polymer useful for molded or extruded products.

BACKGROUND OF INVENTION

This invention relates to a novel method for inserting ionic crosslinks into butyl rubber. Hydrocarbon polymers generally fall into two broad classes, thermoplastic and thermosetting resins. The thermoplastic resins may be readily worked by heating the polymer up to its softening point or melting point. It may then be processed by deformation such as vacuum forming, extrusion of a melt, compression molding, etc.

The thermoset resins can generally not be reworked once they have hardened. In general, thermoset resins owe their unique properties to covalent crosslinks between polymer molecules. The crosslink may be introduced by interaction of various monomers such as copolymerization of styrene in the presence of smaller amounts of divinyl benzene or the reaction of epoxy type resins with polyamines.

Uncured elastomers such as natural rubber and butyl rubber are thermoplastic. They may, however, be crosslinked or vulcanized by the use of sulfur which reacts with the carbon of the unsaturated bonds in the polymer molecules to form in effect a thermoset product which can no longer be fabricated or worked except by machining or otherwise. The crosslinked polymers have found wide utility because of the significant improvement in physical properties by crosslinking. Natural rubber, for example, may be crosslinked or vulcanized by the use of sulfur which reacts with the carbon of the unsaturated bonds in the polymer molecule to form a bridge between two molecules so that one polymer molecule is covalently bonded to a second molecule. If sufficient crosslinks of this type occur, all molecules are joined in a single giant molecule. Once crosslinked, the polymer is intractable and can no longer be fabricated except possibly by machine. It has, however, significantly improved physical properties. Thus, by vulcanizing rubber, elasticity, impact resistance, flexibility, thermostability and many other properties are either introduced or improved.

A third class of polymers has recently been developed which, although they are crosslinked, have a melt or softening point and may even be dissolved in various solvents. At normal use temperatures, these ionic polymers behave similar to crosslinked polymers. At elevated temperatures, however, they are readily deformed and worked in the same manner as thermoplastic resins. These ionic hydrocarbon polymers (ionomers) owe their unique properties to the fact that crosslinking is accomplished by ionic rather than covalent bonding between molecules of the polymer. Typical of these ionic polymers are copolymers of ethylene and ethylenically unsaturated mono or dicarboxylic acids which have been neutralized by metal salts (see for example British Patent 1,011,981 and U.S. Patent 3,264,272).

Elastomeric ionomers are disclosed in copending U.S. application, S.N. 877,849, filed Nov. 18, 1969. These ionomers are based on sulfonic acid moieties which are introduced into the polymer and neutralized to produce ionic domains with resultant crosslinking. It is known that butyl rubber may be reacted with such monomers as acrylonitrile, acrylic acid or maleic anhydride to form graft polymers wherein the reaction monomers are pendent from the butyl rubber backbone, see for example U.S. Pat. 3,432,557, incorporated herein by reference.

SUMMARY OF INVENTION

It has been found that unvulcanized butyl rubber may be converted into an ionic hydrocarbon polymer by introduction of carboxylic acid groups into the linear polymer backbone. This invention relates to a novel method for introducing the carboxylic acid groups into the butyl rubber backbone. Maleic acid, for example, is grafted onto a halogenated butyl rubber by dehydrohalogenating to form conjugated double bonds in the polymer backbone and reacting maleic anhydride with these conjugated double bonds. The polymer so formed may then be ionically crosslinked by neutralizing with metal salts, amines or amine derivatives. These polymers have improved ozone resistance due to their modified structure, which incorporates the grafted monomer into the backbone in a cyclic structure.

DETAILED DESCRIPTION

The expression "butyl rubber" as employed in the specification and claims is intended to include copolymers made from a polymerization reacted mixture having therein from 70 to 99.5% by weight of an isoolefin which has about 4 to 7 carbon atoms, e.g. isobutylene and about 30 to 0.5% by weight of a conjugated multiolefin having from about 4 to 14 carbon atoms, e.g. isoprene. The resulting copolymer contains 85 to 99.5% by weight of combined isoolefin and 0.5 to 15% of combined multiolefin.

Butyl rubber generally has a Staudinger molecular weight of about 20,000 to about 500,000, preferably about 25,000 to about 400,000, especially about 100,000 to about 400,000; and a Wijs Iodine No. of about 0.5 to 50, preferably 1 to 15. The preparation of butyl rubber is described in U.S. Pat. 2,356,128 which is incorporated herein by reference.

For the purposes of this invention, it is preferred that the butyl rubber have incorporated therein from about 0.5 to 6% of combined multiolefin, more preferably 0.5 to 3%, e.g. 2%.

The first step in the preparation of butyl rubber ionomers involves the dehydrohalogenation of halogenated butyl rubber. Halogenated butyl rubber is commercially available and may be prepared by halogenating butyl rubber in a solution containing between 1 to 60% by weight of butyl rubber in a substantially inert $C_5$–$C_8$ hydrocarbon solvent such as pentane, hexane, heptane, etc. and contacting this butyl rubber cement with a halogen gas for a period of about 25 minutes whereby halogenated butyl rubber and a hydrogen halide are formed, the copolymer containing up to one halogen atom per double bond in the copolymer. The preparation of halogenated butyl rubbers is old in the art, see e.g. U.S. 3,099,644 which is incorporated herein by reference. This invention is not intended to be limited in any way by the manner in which butyl rubber is halogenated and both chlorinated and brominated butyl rubber are suitable for use in this invention.

Illustrative of halogenated butyl rubbers is Enjay Butyl HT 10–66, (a chlorinated butyl rubber having 2 mole percent unsaturation and a viscosity-average molecular weight of about 357,000). The halogenated butyl rubber is dissolved in a suitable organic solvent such as $C_5$–$C_8$ substantially inert hydrocarbons, e.g. pentane, hexane, heptane, mineral spirits, cyclohexane, benzene and mixtures thereof. It is then dehydrohalogenated by reaction with a suitable base such as a Group I or II metal hydroxide, Group I metal alkoxides and Group I metal organic amides. Dehydrohalogenation is old in the art. The techniques are well known and form no part of this invention. Preferably, dehydrohalogenation is accomplished at a temperature below 90° C., more preferably about 30° C. to about 90° C., e.g. 75° C.

Typical of the metal hydroxides which may be used are sodium hydroxide, potassium hydroxide and calcium hydroxide. Preferably these metal hydroxides are ball milled in a $C_1$–$C_5$ alcohol such as methanol, isopropanol, etc. to form a dispersion. Illustrative of alkali metal alkoxides which may be used are sodium ethoxide or methoxide and potassium-t-butoxide. The metal organic amides are typified by compounds such as sodium methyl amide. The metal alkoxides are preferred since they are generally soluble in the solvents used and permit the reaction to occur in a homogeneous phase. Where the base has an alkyl group, effectiveness is increased by increasing the number of carbon atoms. For example, $KOC_2H_5$ is more effective than $KOCH_3$ and KO-t-butyl is more effective than either.

Dehydrohalogenation results in a butyl rubber having conjugated double bonds in the linear backbone. Not wishing to be limited by any theory of reaction, it is thought that the typical structure of halogenated butyl rubber is

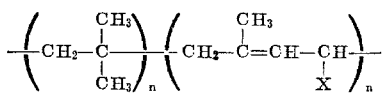

where $n$ and $m$ represent the fraction of isoolefin and conjugated olefin respectively incorporated in the original butyl rubber polymer backbone chain and X is halogen. Dehydrohalogenation results in the formation of conjugated double bonds, e.g.

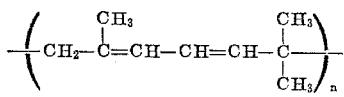

An ethylenically unsaturated compound is then reacted with these conjugated double bonds to form a graft polymer of butyl rubber and the unsaturated compound. The ethylenically unsaturated compound may be present from about 0.5 to about 20 wt. percent, preferably 5 to about 15 wt. percent.

The ethylenically unsaturated compounds suitable for use in this invention have the general formula

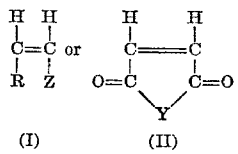

where Z is an electron withdrawing group selected from the group consisting of —COOH, —CN and —CHO, R is $C_1$–$C_4$ alkyl, phenyl, H or Z, preferably H or Z, most preferably Z, and Y is O or NH. Formula II is recognized as the general formula representing such compounds as maleic anhydride or maleic imide. Illustrative of the unsaturated compounds which may be used are maleic anhydride, acrylic acid, acrylonitrile, fumaric acid, acrolein and maleic imide, the preferred unsaturated compounds being maleic anhydride, maleic imide and fumaric acid.

It will be readily evident to those skilled in the art that the practice of this invention is not limited to the use of butyl rubber, but any polymer having the structural formula:

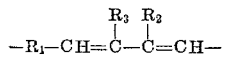

where $R_1$ is a $C_1$–$C_{20}$ alkyl group, a $C_6$–$C_{20}$ aryl, $C_4$–$C_6$ cycloaliphatic group and $R_2$ and $R_3$ are independently a $C_1$–$C_6$ alkyl group, $C_6$–$C_7$ aryl, $C_4$–$C_6$ cycloaliphatic or hydrogen. The term "cycloaliphatic" as used in this invention means any nonaromatic cyclic hydrocarbon whether saturated or unsaturated. It is preferred, however, that such polymers have a molecular weight of about 15,000 to 2,000,000, preferably about 20,000 to about 500,000, most preferably about 350,000.

Since the reaction is a Diels-Alder type reaction, the reaction is spontaneous and no catalyst is necessary. Consequently, grafting of the unsaturated compound to the butyl rubber may be carried out, subsequent to dehydrohalogenation, in the same reaction vessel. Preferably, the grafting step is accomplished at a temperature below 90° C., more preferably about 30° C. to about 90° C., e.g. 75° C.

The typical structure of the graft polymer of this invention is illustrated by the general formula

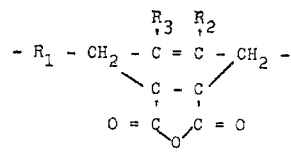

where the illustrative unsaturated compound is maleic anhydride. As a consequence of the cyclic structure, the rubber has improved ozone resistance since rupture of the backbone by oxidation at the site of unsaturation can no longer cause chain scission.

Prior art compositions wherein the monomers of this invention were grafted to butyl rubber resulted in structures wherein the graft monomer was pendent from the side chain. The structure of these products may be illustrated by the structures below:

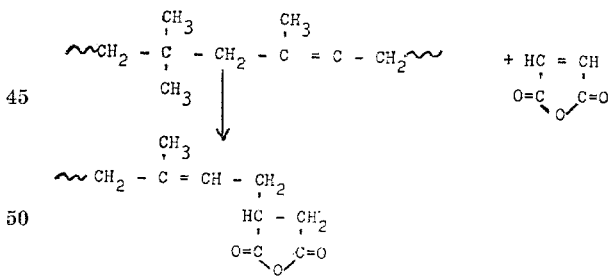

wherein maleic anhydride is shown as the illustrative graft monomer. It is noted that no cyclic structure is formed and that the graft monomer is merely pendent from the butyl rubber backbone. By comparison, the typical structure shown in this invention above incorporates the monomer in cyclic form. The analogous structures are formed regardless of the monomer selected. Hence, the graft polymers of this invention incorporate within the polymer structure the monomer as shown in general terms in the formulas below:

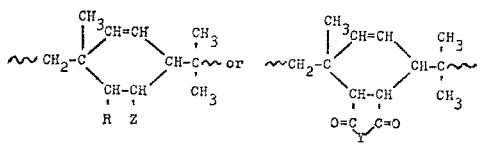

wherein R, Y and Z are as previously defined. Ordinarily, ozonolysis results in rupture in the backbone at the site of unsaturation. In the prior art compositions, where the graft monomer is pendent from the backbone, scission of the backbone occurs with subsequent degradation of the polymer molecular weight. In the product of this invention, however, even when attack at the double bond occurs, scission of the backbone does not result in degradation of the molecular weight of the butyl rubber since the graft monomer itself maintains a continuity of the original polymer backbone structure. The chain cleavage may be illustrated by the generalized formulas as follows:

Prior Art (e.g. U.S. 3,432,577)

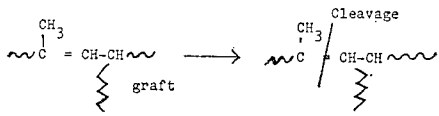

Products of this invention

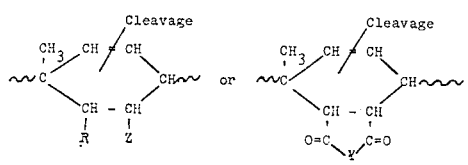

Under similar conditions, cleavage (i.e. by ozonolysis) would lower the molecular weight of the prior art products described in U.S. 3,432,577. Such is not the case with the products of this invention.

Where the unsaturated compound is an acrylic derivative such as acrylonitrile or acrylic acid, it is necessary to take steps to avoid homopolymerization of the unsaturated compound. In such an instance, it is necessary to wash the dehydrohalogenated rubber to remove any unreacted base prior to addition of the unsaturated compound. The graft polymer is then precipitated from solution and may be reacted with various metal salts or amines and amine derivatives. Alternately, the graft polymer may be reacted with these salts and amines while in solution.

It is readily apparent to one skilled in the art that where the electron withdrawing group is not —COOH it becomes necessary to hydrolyze the electron withdrawing group with a dilute acid solution prior to reaction with the metal salt or amine. Where the desired ionomer is the ionomer of an alkali metal and the ethylenically unsaturated compound grafted to the butyl rubber is an anhydride or imide, it is obvious that the ionomer may be formed by hydrolysis with a dilute solution of the alkali metal hydroxide, thereby forming the desired ionomer.

The melt fabricability of the ionic graft polymer is effected not only by the number of crosslinks but, to a much greater degree, by the nature of the crosslink. Surprisingly, however, whereas the neutralization of ionic hydrocarbon polymers of the prior art, e.g. U.S. 3,264,272, is intractable when neutralized with salts of tetravalent metal ions, e.g. $Sn^{+4}$, the butyl rubber ionomers of this invention are found to be fabricable even when crosslinked with such tetravalent ions.

The metal ions which are suitable in forming the ionic copolymers of the present invention may be classified into two groups—noncomplexed metal ions and complex metal ions. With the noncomplexed metal ions, the valence of the ion corresponds to the valence of the metal. These metal ions are obtained from commonly known and used metal salts.

The complex metal ions are those in which the metal is bonded to more than one type of salt group and at least one of which is ionized and one of which is not. Since the formation of ionic polymers requires only one ionized valence, such complex metal ions are equally well suited for use in the present invention. The utility of complex metal ions employed in the formation of ionic copolymers corresponds in their ionized valences to those of the noncomplexed ions. The monovalent metals are, of course, excluded, but the higher valent metals may be included depending upon how many groups can be complexed so as to retain ionic character. The preferred complex metal ions are those in which all but one of the metal valences are complexed and one is readily ionized. In particular, the mixed salts of very weak acids such as lauric and stearic and stronger acids such as formic and acidic may be used.

The noncomplexed metal ions which are suitable in forming ionic copolymers in the present invention comprise mono, di, tri and tetravalent metals in the Groups I, II, III, IV, V, VI-B, VII-B and VIII of the Periodic Table of the Elements. (See page B-3, Handbook of Chemistry and Physics, Chemical Rubber Publishing Co., 47th ed.). Suitable monovalent metal ions are $Na^+$, $K^+$, $Li^+$, $Cs^+$, $Ag^+$, $Hg^+$, and $Cu^+$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Fe^{+2}$, $Pb^{+2}$, $Co^{+2}$, $Ni^{+2}$, and $Zn^{+2}$. Suitable trivalent metal ions are $Al^{+3}$, $Sc^{+3}$, $Fe^{+3}$, and $Y^{+3}$. Suitable tetravalent metal ions are $Sn^{+4}$, $Zr^{+4}$, $Ti^{+4}$, and $Pb^{+4}$.

In addition to the metal ions, other basic materials such as primary, secondary and tertiary amines may be used to form the ionic bonds. The preferred amines have aqueous dissociation constants, $K_b$, greater than $10^{-8}$. The basicity constant may be defined by the expression:

$$K_b = \frac{[(Amine)H^+][OH^-]}{[Amine][H_2O]}$$

for the reaction $$H_2 + amine \rightarrow (amine)H^+ + OH^-$$

where:

$[(Amine)H^+]$ = concentration of aminium ion
$[H_2O]$ = concentration of water
$[Amine]$ = concentration of amine
$[OH^-]$ = concentration of hydroxyl ion The preferred amines have a $K_b$ value in the range of $10^{-1}$ to about $10^{-8}$, preferably about $10^{-3}$ to $10^{-2}$. Illustrative of such amines are anhydrous piperazine, triethylamine, and triethanolamine. The secondary and tertiary amines are more preferred, especially piperazine and triethylamine.

The following examples are presented to give a clear understanding as to how the invention may be carried out, as well as the advantages of its use:

Example 1

70 grams of chlorinated butyl rubber (Enjay Butyl HT 10–66) was dissolved in benzene (to a total weight of 10% solids) and purified by centrifugation. The solution was then placed in a reaction vessel and heated to 75° C. Potassium tertiary butoxide (3.6 grams) was then added. The mixture was heated at 75° C. for 1½ hours. Next, 7.3 grams of maleic anhydride were added and reacted at 75° C. for an additional 1½ hours. The maleic anhydride was then hydrolyzed by reaction with a solution of potassium hydroxide in water (18 gm. KOH/700 ml. $H_2O$) by heating for ½ hour at 75° C., thereby forming a colloidal precipitate of the potassium ionomer in the benzene layer. The colloidal precipitate was washed repeatedly with water, then extracted with cold water, dried and then extracted with hot ether and hot water. The yield was approximately 72%.

Example 2

The colloidal precipitate of the potassium ionomer in benzene of Example 1 was hydrolyzed by washing with a dilute acid solution, washed with water to remove potassium salts, and reacted with 5.02 grams of ferric chloride for 1½ hours at 75° C. The final product was extracted with cold water, dried and then extracted with hot ether and hot water.

Example 3

Following the procedure of Example 1, a colloidal precipitate of the potassium ionomer was formed, hydrolyzed in the manner described in Example 2, and reacted with stannic chloride ($SnCl_4$). The final product was then extracted with cold water, dried and then extracted with warm ether and hot water.

The ionomers of Examples 2 and 3 were molded and found to be highly elastomeric. Chemical tests were performed in order to establish that ionic crosslinks were actually inserted into the Enjay butyl 10–66. (See Table I.) A comparison was made between the ionomers of $Fe^{+3}$ and $Sn^{+4}$, covalently crosslinked Enjaw butyl 10–66 by direct reaction with $SnCl_4$ and $FeCl_3$, and unvulcanized Enjay butyl 10–66. The unvulcanized Enjay butyl 10–66 dissolves in the organic solvent, the $Sn^{+4}$ and $Fe^{+3}$ ionomers and the covalently crosslinked systems of stannic chloride and ferric chloride are merely swelled. In acidic media, the ionomers dissolved while the covalent crosslinked systems only swelled. Thus, the ionic nature of the ionomer crosslink is demonstrated.

TABLE I.—CHEMICAL TESTS SHOWING THE IONIC CHARACTER OF THE SYNTHETIC CROSSLINK

| Material | Reagent | Results |
| --- | --- | --- |
| 1. Linear Enjay butyl 10–66 | Chlorobenzene, heat. | Polymer dissolves. |
| 2. Enjay butyl 10–66 cross-linked by $FeCl_3$. | do | Polymer swells. |
| 3. Enjay butyl 10–66 cross-linked by $SnCl_4$. | do | Do. |
| 4. Ionomer ($Sn^{+4}$) of Enjay butyl 10–66. | do | Do. |
| 5. Ionomer ($Fe^{+3}$) of Enjay butyl 10–66. | do | Do. |
| 6. Linear Enjay butyl 10–66 | Chlorobenzene, $Cl_3CCOOH$, heat. | Polymer dissolves. |
| 7. Enjay butyl 10–66 cross-linked by $SnCl_4$. | do | Polymer swells. |
| 8. Ionomer ($Sn^{+4}$) of Enjay butyl 10–66. | do | Polymer dissolves. |
| 9. Enjay butyl 10–66 cross linked by $FeCl_3$ | Methyl cyclohexane, $Cl_3CCOOH$, heat. | Polymer swells. |
| 10. Ionomer ($Fe^{+3}$) of Enjay butyl 10–66. | do | Polymer dissolves. |

Example 5

The test specimen of Example 4 was remolded in a compression mold for 4 minutes at 300° F. and 24,000 p.s.i.g.

Example 6

The $Sn^{+4}$ ionomer of Example 3 was molded into a test specimen by compression molding for 6 minutes at 220° F. and 24,000 p.s.i.g.

Example 7

The potassium ionomer of Example 1 was compression molded into a test specimen at 12 tons pressure for 4 minutes at 300° F.

Example 8

Uncured chlorinated butyl rubber (HT–10–66) was blended on a rubber mill with 15.2 phr. piperazine and 0.5 part of Santowhite stabilizer. The compounded rubber was compression molded into a test specimen by molding for 2 minutes at 300° F. at 24,000 p.s.i.g.

Example 9

The molded article of Example 8 was shredded and an attempt was made to remold in a compression mold for 4 minutes at 300° F. and 24,000 p.s.i.g. The product did not flow but scorched and disintegrated.

The test specimens of Examples 4–8 were tested to determine their physical properties (see Table II). It was noted that the ionomers and the conventionally cured chlorinated butyl rubber (Example 8) are of comparable quality. Significantly, however, the ionomer is remoldable (Example 5) the resulting remolded sample having good physical properties. The conventionally cured product, however, is not remoldable (Example 9).

TABLE II.—PHYSICAL PROPERTIES OF SOME IONOMERS AND STANDARD CURE CHLOROBUTYL RUBBERS

| Example | Material | Tensile,[1] Modulus, lbs./in.[2] | Modulus,[1] lbs./in.[2] | Elongation, Percent[1] |
| --- | --- | --- | --- | --- |
| 4 | Piperazine ionomer—molded 2 minutes (a) 300° F. and 24,000 p.s.i.g. | 234 | 121 | 990 |
| 5 | Remold (4) for 4 minutes (a) 300° F. and 24,000 p.s.i.g—remolds well. | 532 | 463 | 402 |
| 6 | Tin ionomer—molded 6 minutes (a) 220° F. and 24,000 p.s.i.g | 162 | 139 | 360 |
| 7 | Potassium ionomer—molded 4 minutes (a) 30° F. and 24,000 p.s.i.g. | 60 | 60 | 1,490 |
| 8 | HT–10–66—cure (piperazine)—2 minutes (a) 300° F. and p.s.i.g. | 350 | 65 | 1,270 |
| 9 | Remold (8)—for 4 minues (a) 300° F. and 24,000 p.s.i.g.: no flow, scorched and disintegrated product. | | | |

[1] Average of 4 determinations.

Example 4

A potassium ionomer was formed as in Example 1, hydrolyzed with a dilute acid solution, washed with water to remove the potassium salt and separated from the solvent. A piperazine ionomer was then formed by mixing the hydrolyzed polymer on a rubber mill with 15.2 phr. (parts per 100, based on the rubber) of piperazine and 0.5 phr. of Santowhite stabilizer (4,4-thiobis-3-methyl-6-t-butylphenol). The resulting ionomer was molded into a test specimen by compression molding for 2 minutes at 300° F. and 24,000 p.s.i.g.

Example 10

The compounded chlorinated butyl rubber of Example 8 and the compounded ionomer of Example 4 were molded at 150° C. and 24,000 p.s.i. for varying lengths of time and the physical properties determined on the resulting test pieces (Table III). It will be noted from Table III that the ionomer has physical properties which compare favorably with those of the conventionally cured chlorinated butyl rubber. The 300% modulus for the ionomer, however, is somewhat higher, indicating that the product has greater stiffness.

TABLE III.—STRESS-STRAIN PROPERTIES OF SELECTED MATERIALS [1]

| Time in mold at 150° C. pressure= 24,000 lbs./in.² | Chlorinated butyl rubber (Enjay butyl 10-66) cured with piperazine [2] | | | Piperazine ionomer | | |
|---|---|---|---|---|---|---|
| | Tensile, lbs./in.² (break) | Modulus, lbs./in.² (300%) | Elongation, percent at break | Tensile, lbs./in.² (break) | Modulus, lbs./in.² (300%) | Elongation, percent at break |
| Minutes: | | | | | | |
| ½ | 137 | 48 | 2,070 | 118 | 75 | 940 |
| 1 | 248 | 67 | 1,550 | 258 | 146 | 690 |
| 2 | 325 | 75 | 1,310 | 306 | 167 | 650 |
| 4 | 435 | 89 | 1,170 | 363 | 232 | 495 |
| 8 | 385 | 220 | 550 | 377 | 373 | 340 |
| 16 | 318 | 147 | 510 | | | |
| 30 | 214 | 193 | 350 | | | |

[1] Recipe: 100 parts rubber, 15.2 parts piperazine, 0.5 part santowhite stabilizer. Materials mixed into rubber on mill.
[2] Average of 4 determinations.

What is claimed is:

1. A method for preparing a butyl rubber graft polymer which comprises:
   (a) dehydrohalogenating a halogenated butyl rubber, present in an amount of 1–60 wt. percent, based on the halogenated butyl rubber, in a substantially inert $C_5$–$C_8$ hydrocarbon solvent;
   (b) reacting the dehydrohalogenated butyl rubber with an ethylenically unsaturated compound selected from the group consisting of a compound having the general formula:

(I) 

and a compound having the general formula:

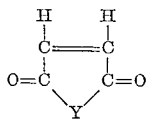

wherein (I), R is selected from the group consisting of a $C_1$–$C_4$ alkyl group, phenyl, H and Z and Z is selected from the group consisting of —COOH, —CN and —CHO; wherein (II), Y is O or NH; and
   (c) recovering the graft polymer so formed.

2. The product of claim 1.

3. The process of claim 1 wherein the ethylenically unsaturated compound is maleic anhydride, acrylonitrile, acrylic acid, fumaric acid, acrolein or maleic imide.

4. In the process of claim 1 wherein the ethylenically unsaturated compound is selected from the group consisting of anhydrides, imides, nitriles and aldehydes, the preparation of a butyl rubber ionomer which comprises:
   (a) hydrolyzing the butyl rubber graft polymer;
   (b) reacting the hydrolyzed polymer with a compound selected from the group consisting of metal salts and amines wherein the metal salt is the salt of a metal selected from the group consisting of metals in Groups I, II, III, IV, V, VI-B, VII-B and VIII of the Periodic Table of the Elements and the amine is selected from the group consisting of primary, secondary and tertiary amines having a basicity constant, $K_b$, value of about $10^{-8}$ to about $10^{-1}$.

5. The product of claim 4.

6. In the process of claim 1 wherein the ethylenically unsautrated compound is selected from the group consisting of anhydrides and imides, the preparation of an alkali metal ionomer of butyl rubber which comprises reacting the butyl rubber graft polymer with a compound selected from the group consisting of alkali metal hydroxides and alkali metal alkoxides.

7. The product of claim 6.

8. The process of claim 4 wherein the ethylenically unsaturated compound is maleic anhydride.

9. The process of claim 8 wherein the metal salt is selected from the group consisting of $FeCl_3$, and $SnCl_4$.

10. The process of claim 8 wherein the amine is selected from the group consisting of piperazine and triethylamine.

11. A method of preparing a butyl rubber-maleic anhydride graft polymer which comprises:
   (a) dehydrohalogenating a halogenated butyl rubber, present in an amount of 1–60 wt. percent, based on the halogenated butyl rubber, in a substantially inert $C_5$–$C_8$ hydrocarbon solvent by reacting at about 30° C. to about 90° C. with a compound where the compound is a Group I metal hydroxide, a Group II metal hydroxide, or a Group I metal alkoxide for about 1 to about 3 hours; and
   (b) reacting the dehydrohalogenated rubber with maleic anhydride at about 30° C. to about 90° C. for about 5 minutes to about 90 minutes.

12. The product of claim 11.

13. The process of claim 11 wherein the alkali metal alkoxide is potassium tertiary butoxide.

14. In the process of claim 13, further reacting the graft polymer by
   (a) hydrolyzing the graft polymer; and
   (b) reacting the hydrolyzed polymer with a compound selected from the group consisting of $FeCl_3$, $SnCl_4$, piperazine and triethylamine thereby forming a butyl rubber ionomer.

15. The product of claim 14.

References Cited

UNITED STATES PATENTS 3,264,272  8/1966  Rees _____ 260—78.5
3,432,577  3/1969  Serniuk _____ 260—879
3,011,996  12/1961 Kuntz _____ 260—41.5

JOSEPH L. SHOFER, Primary Examiner

R. A. GAITHER, Assistant Examiner